United States Patent [19]

Anderson

[11] 4,129,927
[45] Dec. 19, 1978

[54] TENSIONING OF METAL WIRES

[76] Inventor: Nigel I. Anderson, Morgenzicht, Sloane St., Witkoppen, Transvaal, South Africa

[21] Appl. No.: 760,141

[22] Filed: Jan. 6, 1977

[30] Foreign Application Priority Data

Jan. 22, 1976 [ZA] South Africa .......... 76/0364

[51] Int. Cl.² .......... F16G 11/00
[52] U.S. Cl. .......... 24/136 A; 403/314; 403/374
[58] Field of Search .......... 24/136 A, 136 B, 244, 24/155 BR; 85/5 B; 403/374, 314, 368; 279/30, 76, 79; 254/29 A

[56] References Cited

U.S. PATENT DOCUMENTS

| 451,202 | 4/1891 | Thomson | 403/368 X |
| 1,036,547 | 8/1912 | Bell | 24/155 BR |
| 1,157,835 | 10/1915 | Becker et al. | 24/155 BR |
| 2,033,227 | 3/1936 | Brown | 24/136 A |
| 2,111,308 | 3/1938 | Baxendale | 279/30 |
| 2,166,559 | 7/1939 | Richard | 279/30 |
| 3,589,226 | 5/1971 | Shadowens, Jr. | 279/76 X |

FOREIGN PATENT DOCUMENTS

| 923757 | 9/1956 | Fed. Rep. of Germany | 279/76 |
| 345304 | 12/1936 | Italy | 403/314 |

Primary Examiner—Andrew V. Kundrat
Attorney, Agent, or Firm—Cushman, Darby & Cushman

[57] ABSTRACT

A device for holding fencing or similar wire (single-strand or double-strand) to a structure such as a fence post, comprises a body having a first passage through which the wire passes. A second intersecting passage carries a ball or disc which is spring-biased towards the intersection but rolls in the second passage into a position in which it locks the wire under tension. A stop surface at the end of the second passage limits the penetration of the ball or disc into the wire under severe tension.

13 Claims, 23 Drawing Figures

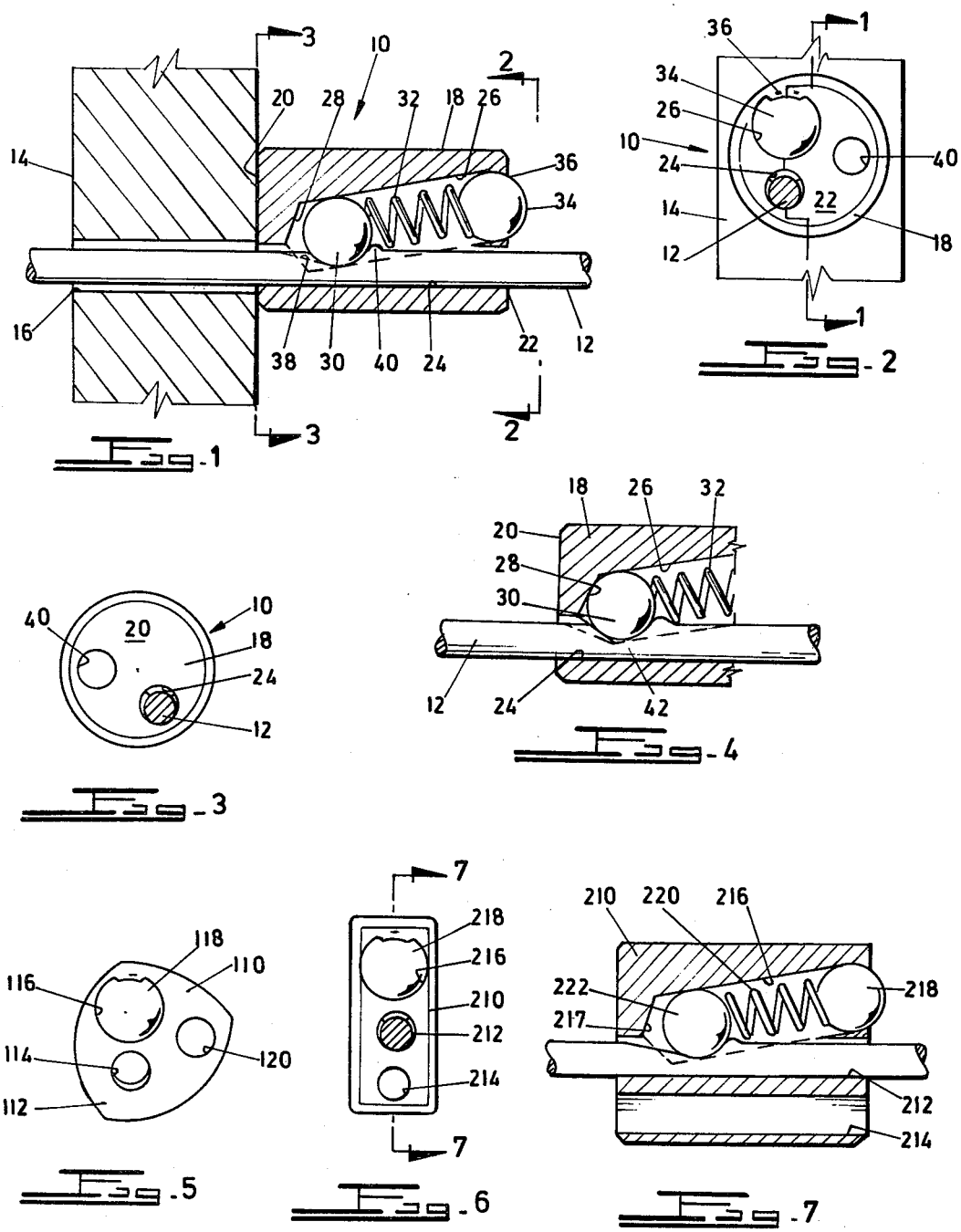

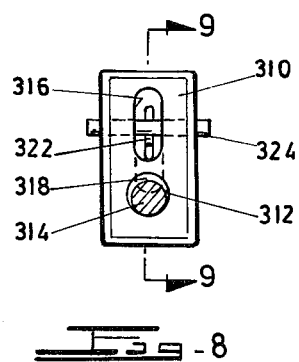
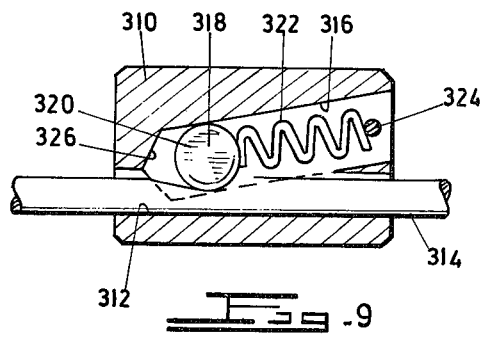
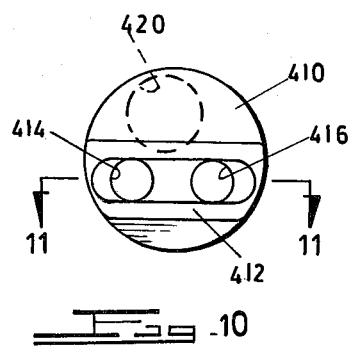
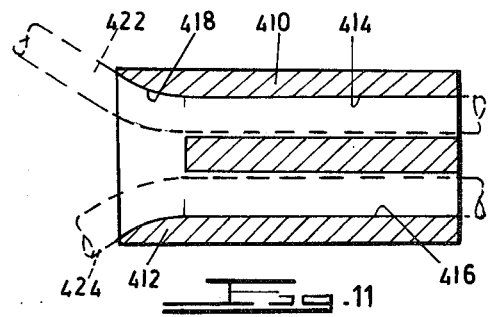
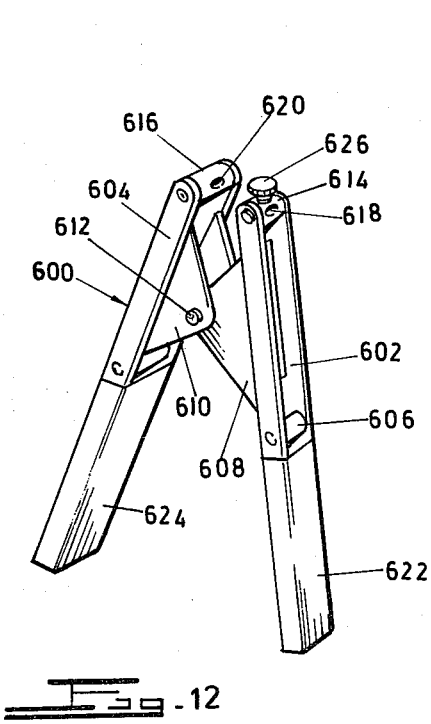
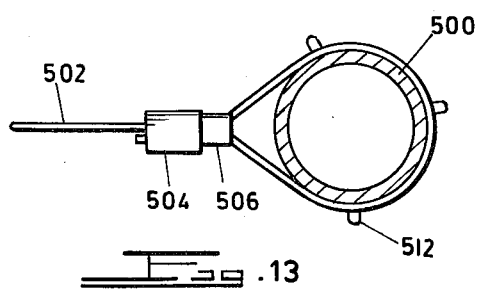
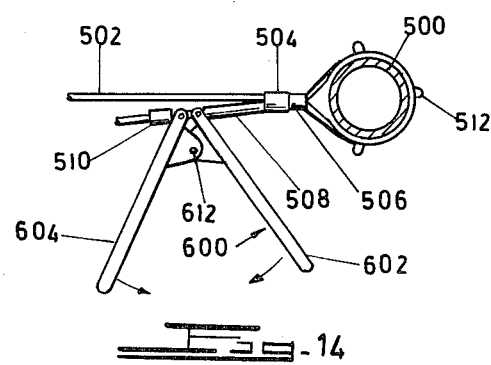

TENSIONING OF METAL WIRES

This invention relates to the tensioning of metal wires of the type used for facing, in particular single-strand wire and double-strand twisted wire such as barbed wire, as well as single-strand and double-strand wires used in certain other applications such as rigging.

In current practice the holding of fencing wire and similar applications of wire under tension gives rise to various difficulties which make the operations of fixing the wire in place and maintaining it under the required tension laborius and time-consuming, and hence expensive.

For instance, in spanning a length of wire between two fence posts, it is customary to fix one end of the wire to one post, often by taking a turn of the wire near the end around the post, and twisting the end repeatedly over the length of wire leading to the second post. At the second post the wire is tensioned by a conventional tensioning tool (which is strung from the post and exerts a grip on the wire, stretching it between the two posts), and then similarly taking a turn of the wire around the second post and twisting it over the tensioned part to hold the end in place and to maintain the tension. Often the twisting process is difficult to carry out manually because of the stiffness of the wire and the limited working space, so that some tension is lost in the process. Furthermore, there is invariably some slack in the short length of wire extending from the tensioning tool to the second post, leading to loss of tension in the strung wire when the tensioning tool is removed. Also, once the wire has been twisted, it is difficult or impossible to retension it at a later date after the wire has stretched and slackened (as it tends to do initially and over the course of a few season's expansion and contraction).

Similar difficulties arise in light rigging operations such as the guying of a television antenna on the roof of a building, an operation often carried out by homeowners who are not expert riggers and do not make use of relatively sophisticated tools or aids such as turnbuckles and the like.

Another aspect of the problem is the joining of two lengths of wire under tension, for instance where fencing wire has broken or been cut between two posts. In conventional practice this operation calls for both lengths of wire to be twisted on to each other to form a joint. Where the wire is relatively stiff or the overlapping lengths are short this operation is necessarily difficult and time-taking, and it is almost impossible to tension the joined wire adequately at the site of the joint.

An object of the invention is to provide a device and a method for holding wire under tension which are easy and quick to use and which lessen or overcome the problem outlined above.

According to one aspect of the invention a device for holding under tension a length of wire having not more than two strands comprises a body formed with a first passage to receive the wire and a second passage extending to a zone of intersection with the first passage at an angle less than 15°, a locking member located in the second passage, a spring urging the locking member towards the zone of intersection, and means securing the spring in the body, the locking member and the second passage being of such a size relatively to the first passage that the locking member cannot enter any part of the first passage except that part included in the zone of intersection, the locking member being a body of revolution about an axis and being adapted to roll about that axis along the second passage and, on attempted withdrawal of the wire in one direction from the body, to lock between the wire and the surface of the second passage and to prevent such withdrawal: the second passage terminating at the zone of intersection in a stop surface of the body inclined at an angle greater then 15° to the surface of the first passage on which the wire bears when locked and positioned so that the locking member when engaging the stop surface obturates only a part of the first passage. In one form the locking member is a sphere. In another it is a disc, preferable a disc with a convex edge profile.

The wire is inserted into the first passage in a direction such that it tends to move the locking member into the second passage against the resistance of the spring. The wire can advance freely through the body in this direction, opposed only by the spring resistance, but any attempt to withdraw it under tension causes locking to take place. If the tension is more than nominal, the locking member will indent the monofilament at the zone where it contacts it. This zone is initially a point, but surface-to-surface contact develops as the tension increases and indenting proceeds. The stop surface of the body prevents the locking member from indenting the wire so deeply that the wire is severed.

The effect is to hold the wire strongly against tension forces of considerable magnitude. However the stop surface of the body ensures that the wire will tend to slip in the device before snapping in the indented zone — a feature of importance in fencing and similar applications.

The locking member may conveniently be of a hard material such as steel, and if it is a sphere it will normally be a hardened ball such as is used in ball bearings.

The body may be machined from steel or another suitable material, or may be of diecast metal alloy or, for some applications, injection-moulded from a hard plastics material.

Another aspect of the invention provides a method of spanning under tension a length of wire having not more than two strands between a first and a second structure, comprising the steps of connecting one end of the wire to the first structure, supporting a device as described above against the second structure, passing the free end of the wire through the first passage of the device, pulling the wire through the device under tension, and releasing the projecting free end so that the wire is held by the device.

The second structure may conveniently be bored so that the wire passes through the bore, the bore being alinged with the first passage in the device and the device being supported directly against the structure.

In a development of the invention the device is provided with a third passage, preferably substantially parallel to the first passage, adapted to receive a further length of wire attached at one end to a structure such as a first fence post. The free end of the wire is threaded through the third passage at a point near a second structure, and then taken around the second structure and inserted into the first passage of the device. When tension is exerted on the projecting end of the wire, relatively to the device, the device moves close to the second structure. Locking takes place when tension is released. The wire is thus fixed in place without any necessity to provide a bore through the second structure to receive the wire.

To guide the wire smoothly into the device as it rounds the post under tension, it is desirable to provide a ferrule, preferably with a flared inner surface surrounding the two lengths of wire in a zone between the device and the second structure. The ferrule may be integral with the device, representing a continuation of the first and third passages, or may be a separate component.

The third passage is also useful in other applications of the device, including that of joining two lengths of wire together under tension. For this application two identical devices are used, located end-to-end and with the first passage of each aligned with the third passage of the other, the two aligned pairs of passages receiving the ends of the two lengths of wire, the devices being oriented so that each bears on the other to maintain the tension.

The invention is also useful in securing a length of chain-link (also called diamond-mesh) fencing material or similar material to a fence post, being used in conjunction with a stretcher bar.

In the drawings:

FIG. 1 is a longitudinal sectioned view through a device of the invention along the line 1—1 of FIG. 2, the device bearing against a fence post and holding a length of fencing wire;

FIGS. 2 and 3 are views from opposite ends of the device of FIG. 1;

FIG. 4 is a fragmentary view of an end part of the device of FIG. 1 in a condition of extreme tension in the wire;

FIG. 5 is a view similar to that of FIG. 2 of a modified device having a diecast body;

FIG. 6 is an end view of a further device of the invention;

FIG. 7 is a longitudinal sectioned view of the device of FIG. 6, taken on the line 7—7 of FIG. 6;

FIG. 8 is a view similar to FIG. 6 of a further embodiment;

FIG. 9 is a longitudinal sectioned view of the device of FIG. 8, taken on the line 9—9 of FIG. 8;

FIG. 10 is an end view of a further device incorporating an integral ferrule;

FIG. 11 is a sectioned longitudinal view on the line 11—11 of FIG. 10;

FIG. 12 is a perspective view of a tool useful in conjunction with the device and method of the invention;

FIG. 13 is a sectioned plan view of a fence post with a device of the invention securing a wire strand under tension to it;

FIG. 14 is a plan view of the structure of FIG. 13 during an initial stage;

Figure 15:
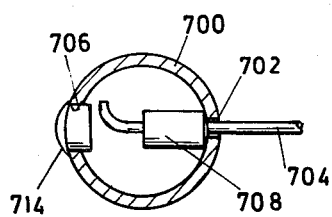
FIG. 15 is a view similar to FIG. 13 of a different securing arrangement at a fence post.

In FIG. 1, a device 10 of the invention for holding a length of fencing wire 12 under tension is seen bearing directly against the side surface of a fence post 14 which has a bore 16 through which the wire 12 passes. The end of the wire to the left in FIG. 1 of the post 14 is secured to a remote post, not seen by any suitable means.

The device 10 comprises a short cylindrical steel body 18 having ends 20, 22 that each define a plane. In this embodiment the ends are flat and parallel to each other. A first passage 24 of circular cross-section somewhat larger in diameter than the wire 12 extends from end to end through the body 18 its axis normal to the ends 20, 22 and receives the wire 12. A second passage 26 of circular cross-section larger than the first passage 24 is formed in the body 18 to extend from a mouth in the end 22 and terminate in the body in a zone of intersection with the first passage 24, the passages 24 and 26 intersecting at an acute angle not less then 15° and preferably in the range 7°–12½°. A particularly preferred angle is 10°. The inner part of the second passage 26 has a hollow conical end surface 28.

Located in the second passage 26 is a locking member 30 in the form of a sphere (in practice a hardened steel ball bearing), urged towards the inner part of the second passage 26 by a steel coil spring 32. The spring 32 is retained in the passage 26 by a plug in the form of a second ball 34 that is itself held in place by crimping of the metal of the body 18 in a zone 36.

The surface 28 is a terminal surface of the second passage 26 and forms a stop surface for the ball 30 should the ball be in its extreme position as in FIG. 4. The inclination of the surface 28 in the zone where it contacts the ball 30 in this condition is approximately 75° to the lower surface (in FIG. 1) of the first passage 24. This angle should in all cases exceed 15°.

The wire 12 is initially inserted from left to right in FIG. 1 through the bore 16 in the post 14 and then through the first passage 24. Tension is exerted on the wire by any suitable tool to draw the wire through the device 10, and the device is moved up against the surface of the post 14 as shown. When the required tautness is reached the tensioning tool is released and the wire tends to retract through the passage 24. This causes the ball 30 to roll about an axis passing through its centre along the surface of the second passage 26 furthest from the wire and to lock or wedge in the position shown, indenting the wire 12 with a concave dent 38 and in extreme cases giving rise to a marked bulge 40 in the wire behind the dent 30. This locks the wire powerfully in place.

End views of the device of FIG. 1 are seen in FIGS. 2 and 3. Note that the device has a third passage 40 substantially parallel to the first passage 24 and of approximately the same diameter. The purpose of the passage 40 will be explained below.

The effective operation of the device 10 and others to be discussed below is dependent on the rolling action of the locking member 30 and not on any pressure which may be exerted by the spring 32 on the locking member. The purpose of the spring 32 is to locate the locking member 30 in contact with the wire 12 and the upper surface (in FIGS. 1 and 4) of the second passage 26 in order to initiate rolling of the locking member 30 when the tension on the wire 12 tends to cause the wire to withdraw from the device. Such rolling motion of the locking member 30 must take place without appreciable slipping occuring between either the locking member and the wire 12 or between the locking member 30 and the upper surface (in FIGS. 1 and 4) of the second passage 26. In practice it has been found that for the coefficients of friction of the metals commonly used for the locking member 30 the wire 12 and the body 18 of the device, the angle of intersection between the axis of the first passage 24 and the second passage 26 should preferably be in the order of 10°, and that some slipping can be expected to occur if the angle exceeds about $12\frac{1}{2}°$. By using materials with a higher coefficient of friction, it is possible to avoid slipping at angles up to about 15°.

It is desirable that the angle of intersection of the first and second passages 24, 26 should be as large as possible, consistent with avoiding slipping. The smaller this angle, the greater the required length of the device 10 in order to form the first and second passages correctly, and also the greater the force exerted by the locking member 30 between the wire 12 and the upper surface (in FIGS. 1 and 4) of the second passage 26 which may result in excessive stress in the wall of the body 18.

Once rolling of the locking member 30 has been initiated, it will continue until a state of equilibrium is established between the amount of tension on the wire 12 and the resistance to withdrawal resulting from the embedding of the locking member 30 into the wire. If very large tension forces are exerted, the locking member 30 will engage the stop surface 28 and pure rolling will then cease. Increased tension forces in the wire encounter the resistance offered by the body 18, through the stop surface 28, but if increased beyond a very high value will lead to slipping of the wire 12 in the body 18, the locking member 30 gouging a groove in the wire as it slips past. This condition presupposes a design of the second passage 26 relative to the first passage 24 such that, when the locking member 30 contacts the stop surface 28, it obturates only a part of the first passage 26, the remaining part 42 (FIG. 4) being sufficient to ensure that the wire 12 is not severed by the action of the locking member.

On the other hand, if the angle of intersection is too great, slipping will occur either between the locking member and the wire or between the locking member and the back surface of the second passage, and the device will fail to hold the wire.

A modified device is seen in FIG. 5 in end view. It is similar to the device of FIGS. 1–4 except that its body 110 is diecast from a zinc alloy used for making hard objects (or may be injection-moulded from hard plastics) and is so shaped that there is a substantial mass of material in a zone 112 between the first passage 114 (corresponding to the first passage 24 of FIGS. 1–3) and the outer longitudinal surface of the body 110. A second passage 116 accommodates a ball 118 which retains a spring and locking member (not seen) in the body 110, while a third passage 120 extends parallel to the first passage 114. The increased mass of material in a zone 112 gives the body maximum strength against the forces acting on it when the device is locked and substantial tension is exerted on a wire in the passage 114. A stop surface (not seen) is formed in the body 110 for the same purpose as that of the stop surface 28 in FIG. 1.

Another form of the device is shown in FIGS. 6 and 7, where the body 210 is generally rectangular and in which a first passage 212 and a third passage 214 are parallel to each other and define a plane in which lies the axis of a second passage 216 which, as in the other embodiments, is inclined at an angle less than 15° to the axis of the first passage and intersects it, terminating in a stop surface 217. A plug in the form of a ball 218 closes the passage 216 and retains a spring 220 and locking member 222 in the passage 216.

The body 210 of FIGS. 6 and 7 may be either machined or diecast if of metal, or moulded if of plastics.

A version of the device without a third passage is seen in FIGS. 8 and 9, and comprises a generally rectangular body 310 which again may be either machined or diecase if of metal; or moulded if of plastics. It has a first passage 312 accommodating a wire 314, and an intersecting second passage 316, which in this case is an elongated slot in cross-section (as will be clear from FIG. 8) and houses a locking member in the form of a disc 318 which has a convex edge profile 320 and is biased in the passage 316 by a spring 322 that is retained in the passage by a fixed transverse pin 324. The disc 318 can roll about its axis in the second passage 316. The cross-section of the slot 316 matches the profile of the disc 318. There is an inclined stop surface 326 at the end of the second passage 316.

The device of FIGS. 8 and 9, although less versatile than that of the previous figure since it lacks a third passage, is suitable for the task performed by the device 10 of FIG. 1, namely to hold under tension a wire extending through a fixed structure in the form of a post or other object against which the body of the device bears.

A modified form of device is shown in FIGS. 10 and 11, where a body 410 is of a general nature similar to the bodies 18 or 110 of FIGS. 1 and 5 but includes an integral ferrule or ring 412 which extends around the mouths of a first passage 414 and a third passage 416 in an end wall of the body 410 (corresponding to the end 20 of the device 10 of FIG. 1). The ferrule itself has a flared mouth 418 which acts as a guide to ensure a smooth bend in lengths 422 and 424 of wire which are located in the first and third passages. The device of FIGS. 10 and 11, which also includes a second passage 420 shown in broken lines in FIG. 10 and internal components similar to those of FIG. 1, is particularly useful for the fencing application explained in more detail below with reference to FIGS. 13 and 14.

In FIGS. 13 and 14, a tubular fence post 500 has a length of wire 502 extending from it under tension to another post, not shown. Initially, the wire 502 is attached at one end to the unseen post and the other end is threaded through the third passage of a device 504 of the type illustrated in any of the preceding figures except FIGS. 9 and 10. The wire is also lead through a ferrule 506 which may be loose but may also be integral with the body of the device 504, as is the integral ferrule 412 of FIGS. 10 and 11. The free end of the wire is then taken around the post 500 and threaded through the ferrule 506 and through the first passage of the device 504 which is oriented in such a way as to cause gripping of the wire 502 when the tension on it is released. To apply such tension, a tubular collar or distance-piece 508 is threaded around the loose end of the wire and a further device 510 of the invention is slipped on to the loose end in a direction such that it locks on the wire when force is applied to the device tending to withdraw the free end of the wire from it.

A tool 600 shown in detail in FIG. 12 is used to pull up the wire 502 to the required tension. The tool comprises arms 602 and 604 each composed of two levers connected by cross-members 606 to each other, each arm carrying flanges 608 or 610 that are articulated to each other by a pivot pin 612 and located towards one end of the arms. At their tips, the arms 602, 604 carry cylindrical cross-pieces 614 and 616 that rotate about their axes are transversely bored at 618, 620 to receive a length of wire. The other ends of the arms carry handles 622, 624. The cylinder 614 may carry a hand screw 626 extending transversely into the bore 618, or other means for clamping a length of wire in the bore 608.

The tool 600 of FIG. 14 is set up as shown between the distance-piece 508 and the device 510 with the end of the wire 502 extending through the transverse bores 618, 620 in the cross-pieces 614, 614, on the arms 602 and 604. The arms 602, 604 are then brought together under pressure as shown by the arrows, causing the device 510 to lock on the wire 502 and the device 504 to slide over the wire to a position near the post 500. At the same time wire is drawn under tension through the device 504, being guided into it by the ferrule 506, to transmit tension throughout the length of the wire 502. When the required tension is reached, perhaps by a series of scissors-like actions of the tool 400, the device 510 being advanced along the wire 502 after each such action, the wire is cut off near the device 504 (as seen in FIG. 13) and the connection of the wire 502 under tension to the post 500 is now complete. Lugs 512 on the post prevent the wire from slipping downwards on the post even if the wire later slackens. (By using the hand screw 626 or other clamping means to clamp the cross-piece 614 to the wire 502, the need for the device 510 of FIG. 14 can be avoided.)

Figure 16:
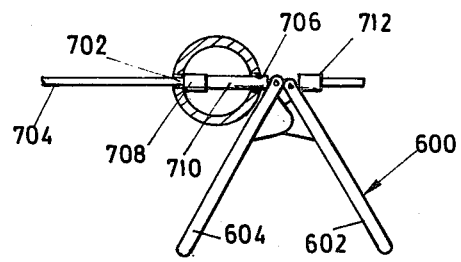
FIG. 16 is a view similar to FIG. 14 of the structure of FIG. 15.

FIGS. 15 and 16 show the use of a device 708 of the invention with no third passage, such as the device of FIGS. 8 and 9, to attach a wire to a fence post. In these figures a tubular fence post 700 is, unlike the post 500 of FIGS. 13 and 14, provided with a bore 702 through which a length of wire 704 extends. The post is provided with a hole 706 opposite the bore 702, the hole 706 being of greater cross-section than the device 708. The free end of the wire 704 is threaded through the bore 702 and through the first passage of the device 708, and a length of spacer tube 710 is threaded over the loose end of the wire, followed by the bored cross-pieces 610, 616 of a tool 600. Finally another locking device 712 is threaded on to the wire 704 and moved along it to abut the tool 600. When the arms 602, 604 of the tool 600 are brought together tension is applied to the wire and it is drawn through the device 708, which bears on the inner wall of the post 700. When the required degree of tension is attained the operator opens the arms of the tool 600 to expose a length of the wire beyond the device 708 which can be cut and bent out of the way as shown in FIG. 15. A plastics cap or plug 714 may finally be inserted in the hole 706 to close such hole.

In countries with dry climates, it is usually acceptable to pierce a fence post with such openings as the bore 702 and hole 706 in the post 700 of FIGS. 15 and 16. However in countries with a wet and cold climate such openings are not desirable since they can lead to the entry of water which may freeze and burst the post, as well as to problems of corrosion, and in such countries the arrangement of FIGS. 13 and 14 will be preferred.

Figure 17:
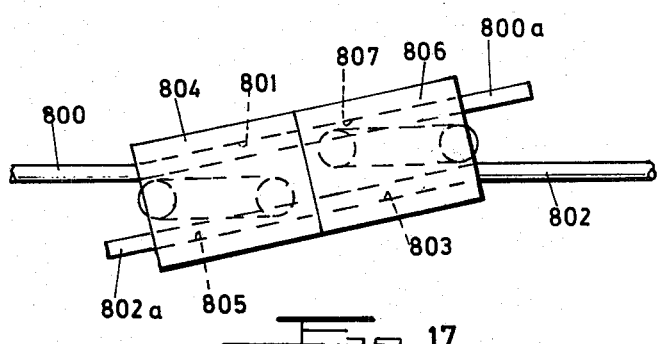
FIG. 17 is a plan view of a finished joint of the invention between two lengths of wire.
Figure 18:
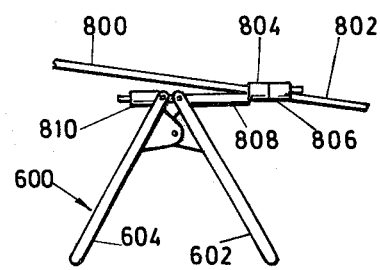
FIG. 18 is a view similar to FIG. 14 of the structure of FIG. 17 in an initial stage.

The joining of two lengths of single-strand wire is seen in FIGS. 17 and 18. In FIG. 18, the two lengths 800 and 802 have overlapping free ends, their other ends being secured to fixed structure (not seen). Each free end is inserted in the third passage 801, 803 of a device 804, 806 of the type of FIGS. 1 to 7 or 10 and 11, with the two such devices 804, 806 oriented so that they are capable of bearing on each other and locking. The projecting parts of the free ends are then inserted through the first passages 805, 807 of the devices 804, 806 as shown in FIG. 17. Tension on one of the free ends 802a is exerted relatively to the other 800a by means (FIG. 18) of a tool 600, a spacer tube 808 and a further device 810 locked on the free end 802a. By drawing the arms 602, 604 of the tool 600 together (repeatedly if necessary, the device 810 being repositioned after each action) the wires are tensioned relatively to each other and held together by the devices 804, 806. By slackening the tool and cutting the free ends of the wires as seen in FIG. 17 an extremely neat and efficient joint is achieved, with the minimum of time and effort. Note that with this arrangement tensioning is achieved at the joint itself, a feat not capable of being achieved with traditional systems.

Figure 19:
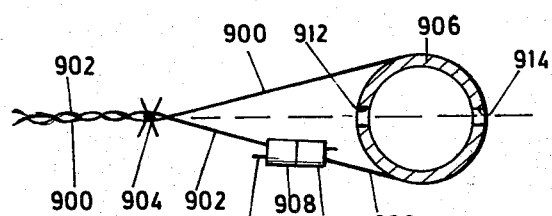
FIG. 19 is a sectioned plan view of a fence post with a pair of devices of the invention securing a length of double-strand barbed wire to the post.

The securing of double-stranded barbed wire to a fence post with the device of the invention is seen in FIG. 19. The twisted strands 900, 902 carrying barbs 904 are unwound from each other near the post 906 to which they are to be attached, and any barbs in the immediate area of the post are removed. One of the strands 900 is then led around the post to overlap the other strand 902. With the use of two devices 908, 910 each having a third passage as described earlier the two strands can be effectively joined together in the manner described with reference to FIGS. 17 and 18, leading to the result shown in FIG. 19. If the post 906 is bored (as at 912, 914) the strand 900 may be taken through the bores, rather than around the post, to meet the other strand 902.

Figure 20:
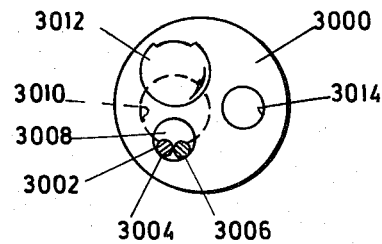
FIG. 20 is a view similar to FIG. 2 of a device of the invention holding a length of double-strand wire under tension.

Double-strand barbed wire may also be used with the device of the invention, analogously to the single-strand wires shown in preceding figures, by unwinding a length of the twisted strands from each other in the zone of interest, removing barbs in that zone, and inserting the two strands side by side through the first passage of the device. FIG. 20 illustrates how such double-strand wire is held in a device 3000 identical to the device 10 of FIG. 1. The first passage 3002 of the device 3000 contains the two strands 3004, 3006, each contacted and locked by a ball 3008 housed in a second passage 3010 and plugged by a ball 3012. A fluid passage 3014 corresponds to the fluid passage 40 of FIG. 1.

Figure 21:
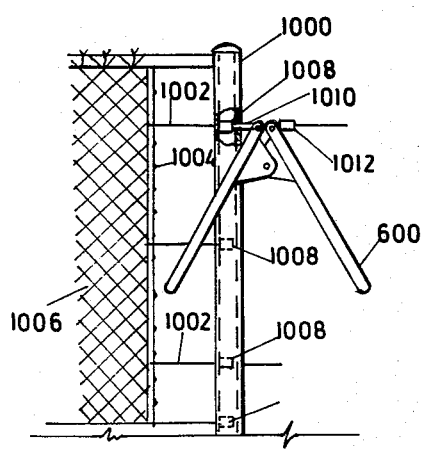
FIG. 21 is an elevation view of an initial stage in the attachment of an expanse of chain-link fencing material to a fence post.
Figure 22:
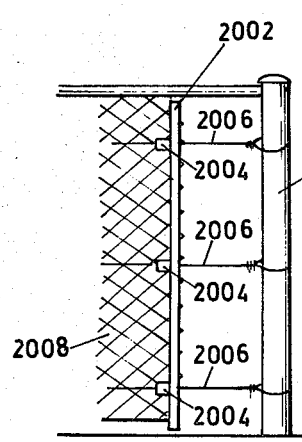
FIG. 22 is a view similar to FIG. 21 of an alternative manner of attachment of chain-link material to a fence post.

Two ways of tensioning fencing material in the form of chain-link mesh are seen in FIG. 19 and FIGS. 21-22. In FIG. 21, a post 1000 of the type seen in FIGS. 15 and 16 is used, and lengths of wire 1002 are attached at vertical intervals to a stretcher bar 1004 to which the mesh material 1006 is attached. Devices 1008 of the invention (which need not have a third passage) are used, located inside the post 1000. Tensioning takes place by drawing the wires 1002 through the devices 1008 as shown, with the help of a tool 600, spacer tube 1010 and a further device 1012 of the invention locked on the end of each wire 1002 in turn. Tensioning takes place until the mesh 1006 is fully taut, when the stretcher bar 1004 will stand alongside the post 1000.

Figure 23:
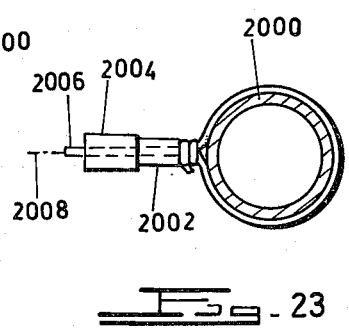
FIG. 23 is a sectioned plan view of the post of FIG. 21 with the structure in its final position.

In the alternative system of FIGS. 22 and 23, a post 2000 suitable for wet, cold climates and having no bores or openings in its surface is used in conjunction with a stretcher bar 2002 on which devices 2004 of the invention abut directly. Lengths of wire 2006 fixed at one end to the post 2000 by conventional means such as twisting are taken through holes (not seen) in the stretcher bar to extend into the first passages of the devices 2004. By tensioning the wires 2004 with a tool 600 in the manner by now made clear the stretcher bar is brought alongside the post 2000 (FIG. 23) so that the fencing material 2008 is properly located and tautly supported.

In the applications described above, it is advisable, if slackness if likely to develop in the wire with time, to leave a free end of the wire which is long enough to allow retensioning. This operation takes place with the use of a tool 600, spacer tube and (if the hand screw 626 is not desired) with a device of the invention as described with reference to some of the earlier figure such as 12 and 13, and is similar to the initial tensioning operation.

Although a device of the invention such as the device 10 of FIG. 1 can be moved in one direction along the wire at any time, even after resisting large tension forces for a lengthy period, the device is designed so that initial movement in that direction calls for a modicum of force to be exerted, at most requiring a tap from a hammer to free the locking member from the dent it has made in the surface of the wire. This relatively slight resistance to release enhances the usefulness of the device in prevented unwanted slip of the device along the wire.

The wire used with the device of the invention need not necessarily be of circular cross-section. For instance oval-section wire can be held satisfactorily with it.

As an example of dimensions, a device of the kind shown in FIGS. 1–4 may be constructed as follows:

Diameter of body 18: 16 mm; length of body 28: 25.4 mm; diameter of first and third passages 24, 40: 5 mm; diameter of second passage 26: 6.5 mm. This construction has been found useful for holding wire of standard wire gauges in the range 7–11 (4.47 to 2.85 mm diameter). If the device has diameters of 3.8 mm for the first and third passages 24, 40, the device will be suitable for holding wire of gauges 10 to 15 (3.25 to 1.83 mm diameter).

The wires used in the device of the invention may be galvanised or otherwise coated, for instance with plastics material as commonly used on fencing wire in Europe and elsewhere.

I claim:

1. A device for holding under tension a length of wire having not more than two strands, said device comprising a body formed with a first passage to receive the wire and a second passage extending to a zone of intersection with the first passage at an angle of intersection less than 15°, a locking member located in the second passage and having a cross-sectional shape substantially similar to a cross-sectional shape of said second passage, a spring urging the locking member towards the zone of intersection, and means securing the spring in the body, the locking member and the second passage being of such a size relatively to the first passage that the locking member cannot enter any part of the first passage except that part included in the zone of intersection, the locking member being a body of revolution about an axis and being adapted to roll about that axis along the second passage and, on attempted withdrawal of the wire in one direction from the body, to lock between the wire and the surface of the second passage to prevent such withdrawal, the second passage terminating at the zone of intersection in a stop surface of the body inclined at an angle greater than 15° to the surface of the first passage on which the wire bears when locked and positioned so that the locking member, when engaging the stop surface, obturates only a part of the first passage, said body further having a third passage formed therein for receiving another length of wire, and a ferrule formed integrally with the body and providing an extension of the first and second passages.

2. The device of claim 1 in which the locking element is a sphere.

3. The device of claim 1 in which the locking element is a disc with a convex edge profile.

4. The device of claim 1 in which the first and second passages are each substantially rectilinear.

5. The device of claim 1 in which the spring is a coil spring located wholly in the second passage and is retained in the second passage by a plug located in the second passage, the body being crimped at a mouth of the second passage to retain the plug in the body.

6. The device of claim 5 in which the plug is a sphere.

7. The device of claim 1 in which the end of the body towards which the spring urges the locking member defines a plane, and the first passage has an axis substantially normal to that plane.

8. The device of claim 1 in which the third passage is of substantially the same cross-section as the first passage.

9. The device of claim 1 in which the third passage is substantially parallel to the first passage.

10. The device of claim 1 in which the ferrule has a flared mouth.

11. The device of claim 1 in which the angle of intersection of the first and second passages is in the range of 7° to 12¼°.

12. The device of claim 11 in which the angle of intersection is substantially 10°.

13. A device for holding under tension a length of wire having not more than two strands, said device comprising a body having parallel planar ends and having a first passage extending therethrough substantially normal to said ends, said first passage receiving the wire, said body further having a single second passage open at one end to the exterior thereof and extending therethrough with its other end opening to a zone of intersection with said first passage at an angle of intersection less than 15°, a single locking member located in said second passage, a spring urging said locking member towards said zone of intersection, said body being crimped at said one end of the second passage open to the exterior for retaining said spring in said body, said locking member and said second passage having a larger cross-sectional size relatively to a cross-sectional size of said first passage whereby said locking member cannot enter any part of said first passage except a part included in said zone of intersection, said locking member having a body of revolution about an axis and arranged to roll thereabout along said second passage and, on attempted withdrawal of the wire in one direction from said body, to lock between the wire and a surface of said second passage to prevent such withdrawal; said second passage terminating at said zone of intersection in a stop surface of said body inclined at an angle greater than 15° to a surface of said first passage on which the wire bears when locked and positioned so that said locking member, when engaging said stop surface, obturates only a part of said first passage, said body having a third passage to receive a further length of wire, said third passage being substantially parallel to said first passage and having a cross-section to accommodate with clearance another length of wire of the same cross-section as the length of wire to be received in said first passage.

* * * * *

UNITED STATES PATENT AND TRADEMARK OFFICE
CERTIFICATE OF CORRECTION

PATENT NO. : 4,129,927
DATED : December 19, 1978
INVENTOR(S) : Nigel I. Anderson It is certified that error appears in the above-identified patent and that said Letters Patent are hereby corrected as shown below:

Claim 1,

Column 10, line 12, before "passages" delete "second" and insert --third--.

Signed and Sealed this

Eighth Day of January 1980

[SEAL]

Attest:

SIDNEY A. DIAMOND

Attesting Officer

Commissioner of Patents and Trademarks